United States Patent
Micali

(10) Patent No.: US 10,803,374 B2
(45) Date of Patent: Oct. 13, 2020

(54) COUNTERFEIT PREVENTION

(71) Applicant: Silvio Micali, Brookline, MA (US)

(72) Inventor: Silvio Micali, Brookline, MA (US)

( * ) Notice: Subject to any disclaimer, the term of this patent is extended or adjusted under 35 U.S.C. 154(b) by 0 days.

(21) Appl. No.: 16/317,859

(22) PCT Filed: Aug. 7, 2017

(86) PCT No.: PCT/US2017/045678
§ 371 (c)(1),
(2) Date: Jan. 15, 2019

(87) PCT Pub. No.: WO2018/031437
PCT Pub. Date: Feb. 15, 2018

(65) Prior Publication Data
US 2019/0236427 A1    Aug. 1, 2019

Related U.S. Application Data

(60) Provisional application No. 62/372,169, filed on Aug. 8, 2016.

(51) Int. Cl.
*H04L 9/32* (2006.01)
*G06K 19/077* (2006.01)
(Continued)

(52) U.S. Cl.
CPC ......... *G06K 19/0776* (2013.01); *G06F 7/588* (2013.01); *G06F 21/00* (2013.01);
(Continued)

(58) Field of Classification Search
CPC ........ H04L 9/3278; H04L 9/32; H04L 9/3271
See application file for complete search history.

(56) References Cited

U.S. PATENT DOCUMENTS

| 5,478,990 A | 12/1995 | Montanari et al. |
| 7,681,103 B2 | 3/2010 | Devadas et al. |

(Continued)

FOREIGN PATENT DOCUMENTS

| EP | 2 230 793 A2 | 9/2010 |
| JP | 2008-541260 A | 11/2008 |

(Continued)

OTHER PUBLICATIONS

Saloomeh Shariati, "Image-based Physical Unclonable Functions for Anti-counterfeiting," PhD thesis, Feb. 1, 2013, pp. 93-103, URL:https://dial.uclouvain.be/pr/boreal/object/boreal:124681/datastream/PDF_01/view.

(Continued)

*Primary Examiner* — Thien M Le
*Assistant Examiner* — April A Taylor
(74) *Attorney, Agent, or Firm* — Muirhead and Saturnelli, LLC

(57) ABSTRACT

A circuit provides a physically unclonable function. The circuit includes a first portion that provides a random value that varies according to an input to the circuit and a second portion that hashes the random value to provide an output value from the circuit. The first portion covers the second portion to prevent access to the random value. A breach of the first portions may alter operation of the first portion in a detectable manner. The first portion may cover a surface of a cube or parallelepiped. The first portion may be wrapped around a parallelepiped a plurality of times to cover each facet thereof from different directions. The output from the second portion may not intersect the first portion. The circuit may also include an external layer disposed on the first portion. The external layer may be glued to the first portion.

9 Claims, 14 Drawing Sheets

(51) Int. Cl.
*G06F 21/60* (2013.01)
*G06F 21/86* (2013.01)
*G06F 21/00* (2013.01)
*G06F 7/58* (2006.01)

(52) U.S. Cl.
CPC ............ *G06F 21/602* (2013.01); *G06F 21/86* (2013.01); *H04L 9/3278* (2013.01)

(56) References Cited

U.S. PATENT DOCUMENTS

| | | | |
|---|---|---|---|
| 7,856,116 B2* | 12/2010 | Rodriguez | G06K 9/22 382/100 |
| 8,029,320 B1 | 10/2011 | Lustig et al. | |
| 9,116,491 B2 | 8/2015 | Murakata | |
| 9,246,686 B1 | 1/2016 | Holland et al. | |
| 10,122,537 B2* | 11/2018 | Kim | H04L 9/3278 |
| 10,491,407 B2* | 11/2019 | Voutilainen | H04L 9/3278 |
| 2003/0204743 A1* | 10/2003 | Devadas | G06Q 20/3674 726/9 |
| 2008/0282206 A1 | 11/2008 | Anderson et al. | |
| 2009/0008924 A1 | 1/2009 | Ophey et al. | |
| 2009/0083833 A1* | 3/2009 | Ziola | H04L 9/3271 726/2 |
| 2009/0282259 A1 | 11/2009 | Skoric et al. | |
| 2010/0073147 A1 | 3/2010 | Merchan et al. | |
| 2011/0099117 A1 | 4/2011 | Schepers et al. | |
| 2012/0033810 A1 | 2/2012 | Devadas et al. | |
| 2013/0047209 A1 | 2/2013 | Satoh et al. | |
| 2013/0127442 A1 | 5/2013 | Satoh et al. | |
| 2013/0147511 A1* | 6/2013 | Koeberl | H04L 9/3263 326/8 |
| 2013/0246809 A1 | 9/2013 | Beckmann et al. | |
| 2013/0246881 A1 | 9/2013 | Goettfert et al. | |
| 2014/0091832 A1 | 4/2014 | Gotze et al. | |
| 2014/0201851 A1* | 7/2014 | Guo | G06F 1/26 726/34 |
| 2014/0266296 A1 | 9/2014 | Wang et al. | |
| 2014/0334622 A1 | 11/2014 | Smyth et al. | |
| 2015/0161415 A1 | 6/2015 | Kreft | |
| 2015/0183257 A1 | 7/2015 | Glendenning et al. | |
| 2017/0330200 A1 | 11/2017 | Micali et al. | |
| 2018/0211264 A1 | 7/2018 | Micali | |

FOREIGN PATENT DOCUMENTS

| | | |
|---|---|---|
| JP | 2011-526113 A | 9/2011 |
| JP | 2011-198317 A | 10/2011 |
| JP | 2014-026227 A | 2/2014 |
| JP | 2015-023301 A | 2/2015 |
| WO | WO 2016/073041 A1 | 5/2016 |

OTHER PUBLICATIONS

Chiraag S. Juvekar, et al., "A Keccak-Based Wireless Authentication Tag with per-Query Key Update and Power-Glitch Attack Countermeasures," 16.2, ISSCC 2016 / Session 16 / Innovations in Circuits and Systems Enabled by Novel Technologies.

Srinivas Devadas, et al., "Design and Implementation of PUF-Based "Unclonable" RFID ICs for Anti-Counterfeiting and Security Applications," 2008 IEEE International Conference on RFID, Apr. 16-17, 2008.

* cited by examiner

COUNTERFEIT PREVENTION

TECHNICAL FIELD

This application relates to the field of counterfeit prevention, and more particularly to the field using a physically unclonable value for unique identification to prevent counterfeiting, and to the secure and practical construction of physically unclonable functions.

BACKGROUND OF THE INVENTION

The need to guarantee that one is dealing with the unique copy of a good is well established. Consider, for example, the case of banknotes. Ever since banknotes have been invented, banks and governments have been fighting duplicators and counterfeiters. A counterfeit, the so-called Superdollar, achieved notoriety as the United States alleged that it was made by a foreign government. It has become easy to produce passable counterfeits using digital technology; $5 bills have been converted to $100 bills using ordinary HP printers, and the fraud has been recently detected only because it went on for two years and involved hundreds of counterfeits.

In the hope of mitigating the problem of forgeries, many security measures have been taken: special (e.g., embossed) paper, watermarks, special inks, etc. Redesigned $20, $50, $10, and $5 bills were introduced between 2003 and 2008. A new $100 bill—the most commonly counterfeited bill, according to the United States Secret Service—entered circulation last year. It includes two new security features: a blue 3-D security ribbon and a color-changing bell in an inkwell. No security measure so far, however, has proved to be foolproof, and new measures have to be continually invented.

Quantum mechanics has been recently relied upon to generate unforgeable money. These schemes are very interesting, but not yet practical, and certainly difficult to analyze. The problem is exacerbated by an additional constraint: namely, its solution must not only be feasible, but also cheap. Indeed, an unforgeable $100-banknote that costs—say—$10 to mass produce would not be too useful.

Accordingly, it is desirable to provide an approach to unforgeable money (and more generally to authenticate goods and information about goods) that is practical, secure, and inexpensive. In particular, it is desirable to provide such approaches based on (1) physically uncloned values, PUVs, a weaker form of physically unclonable functions, PUFs, as well as (2) a new and secure way of using PUFs. It is also desirable to provide a practical and secure way to construct PUFs.

SUMMARY OF THE INVENTION

According to the system described herein, a circuit that provides a physically unclonable function includes a first portion that provides a random value that varies according to an input to the circuit and a second portion that hashes the random value to provide an output value from the circuit, where the first portion covers the second portion to prevent access to the random value. A breach of the first portions may alter operation of the first portion in a detectable manner. The first portion may cover a surface of a cube or parallelepiped. The first portion may be wrapped around a parallelepiped a plurality of times to cover each facet thereof from different directions. The output from the second portion may not intersect the first portion. The circuit may also include an external layer disposed on the first portion. The external layer may be glued to the first portion.

According further to the system described herein, a physical device includes means for consistently producing a particular unpredictable output based on a particular input and on microstructure of the device, means for enabling verification that the device satisfies a given property, and means for making it substantially difficult to manufacture another device that satisfies the given property and that produces the particular output in response to the particular input. The device may be an integrated circuit and the means for enabling verification may include exposing the layout of the circuit to allow comparison with a pre-specified layout.

According further to the system described herein, generating a uniquely authentic copy of information using a physical device that consistently produces unpredictable outputs based on inputs and the microstructure of the device, the device being verified to satisfy a given property, and it being substantially difficult to manufacture another device that satisfies the given property and that produces a particular output in response to a particular input. Generating the uniquely authentic copy of information includes causing the device to be provided with a specific input to produce a specific output, causing the generation of a digital signature of the response and the information, and causing at least the device and the digital signature to be made available. Generating the uniquely authentic copy of information may also include making available the information, the specific input, and/or the specific output. The information may be a value of a banknote, and the digital signature may be produced on behalf of an issuer of the banknote. The information may be information about a physical good and the physical device may be securely attached to the good. The information may be the empty information. The information may be information about the contents of a physical packet, and the physical device may securely seal the packet. The packet may be sealed, and the physical device may be secured to the seal of the packet. The packet content may be a medicinal drug, food, and/or a liquid. The digital signature may be made available on the web or as an answer to a query. At least one of: the information, the specific input, and the specific output may be made available on the World Wide Web or as an answer to a query.

According further to the system described herein, a non-transitory computer-readable medium contains software that generates a uniquely authentic copy of information using a physical device that consistently produces unpredictable outputs based on inputs and the microstructure of the device, the device being verified to satisfy a given property, and it being substantially difficult to manufacture another device that satisfies the given property and that produces a particular output in response to a particular input. The software includes executable code that causes the device to be provided with a specific input to produce a specific output, executable code that causes the generation of a digital signature of the response and the information, and executable code that causes at least the device and the digital signature to be made available. The software may also include executable code that makes available at least one of: the information, the specific input, and the specific output. The information may be a value of a banknote, and the digital signature may be produced on behalf of an issuer of the banknote. The information may be information about a physical good and the physical device may be securely attached to the good. The information may be the empty information. The information may be information about the contents of a physical packet, and the physical device may securely seal the packet. The packet may be sealed, and the physical device may be secured to the seal of the packet. The packet content may be a medicinal drug, food, and/or a liquid. The digital signature may be made available on the web or as an answer to a query. At least one of: the information, the specific input, and the specific output may be made available on the World Wide Web or as an answer to a query.

According further to the system described herein, uniquely authentic information about a physical good is provided by an entity E via a physical device D consistently producing a particular unpredictable output based on a particular input and on a unique and hard to duplicate microstructure of D, wherein an input-output function of D is hard to infer. In the system described herein, an entity E initially associates to each date d in a sequence of dates an input Cd, where each input Cd is hard to predict solely given the previous inputs C1, . . . , Cd−1. Each such input Cd is then provided to the physical device so as to produce an output Rd. Each output Rd is then digitally signed together by E with information I that requires unique authentication to produce a digital signature Sd, where the input Rd is hard to compute from Sd, while the signature Sd can be easily verified given Rd and I. The device is then attached to the good about which the uniquely authentic information applies, and the information I and the digital signatures are stored in the device or otherwise made available with the good. At each date d of the sequence of dates, the input Cd is then publicized, possibly in authenticated form. To verify the uniquely authentic information I about the good at a date d, one provides the publicized Cd as an input to the device attached to the good so as to provide an output Rd, and then checks whether one of the digital signatures made available is E's digital signature of Rd together with I.

According further to the system described herein, (1) a physical device P, consistently producing a particular unpredictable output based on a particular input and on a unique and hard to duplicate microstructure of the physical device, where an input-output function of P is hard to infer, is constructed from (2) a simpler physical device D, consistently producing a particular unpredictable output based on a particular input and on a unique and hard to duplicate microstructure of D, where the input-output function is not necessarily hard to infer.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

Figure 1:
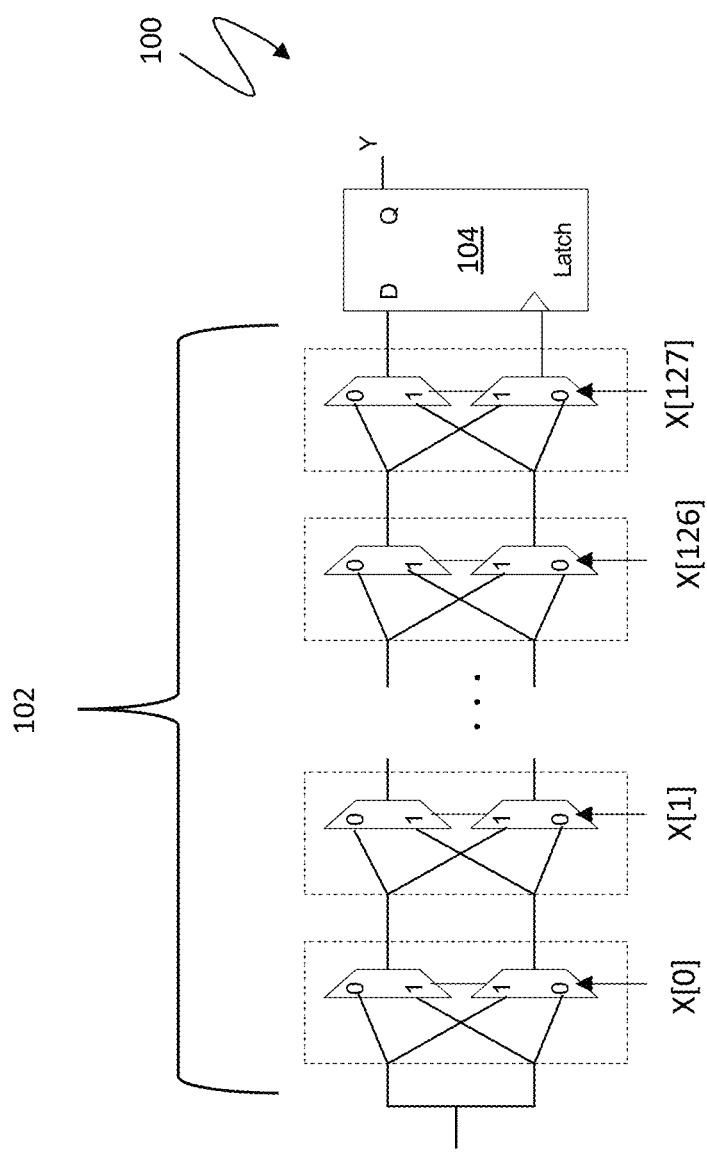
FIG. 1 is a schematic diagram illustrating an arbiter circuit, according to an embodiment of the system described herein.

The system described herein provides a mechanism to securely and cheaply manufacture unforgeable banknotes and to ensure that goods and/or information are authentic.

1. Unique Authentication Using PUVs

A Physically Unclonable Value (PUV) is a physical device with an associated verification algorithm, A, mapping pairs of devices to just YES or NO. Essentially, if D is a PUV, then:

i) D consistently produces a unique random value in response to a single chosen input, and ii) It is hard to produce two devices D1 and D2, such that (a) A(D1)=A(D2)=YES, and (b) D1 and D2 produce the same value on the same chosen input c.

PUVs are different from PUFs (physically unclonable functions). Intuitively, a PUF is a device that not only is physically uncloneable, but also is mathematically uninferrable, and is thus modeled as a black-box random function F. In other words, no matter how one may choose a sequence of inputs x1, . . . , xn, learning the values F(x1), . . . , F(xn), he should not be able to predict better the value of F(x), for any x≠x1, . . . , xn, better than by random guessing. By contrast, a PUV is not a physically unclonable device implementing a random function, but a physical device that is unclonable, as long as the device passes the inspection of a designated verification algorithm, among all devices that pass the inspection of the same algorithm, and implementing a single "challenge-response" pair (c, v), where v has been randomly chosen, with a "stability requirement", that is, the device must output v whenever it is given c as an input. For all we are concerned, the PUV can provide the same output on all inputs other than c.

A digital signature scheme consists of three fast algorithms: a probabilistic key generator, G, a signing algorithm, S, and a verification algorithm, V. Given a number k as an input (e.g., k=4,000), a player x uses G to produce a pair of k-bit keys (i.e., strings): a "public" key PKx and a "secret" signing key SKx. A public key does not "betray" its corresponding secret key. That is, even given knowledge of PKx, no one other than x is able to compute SKx in less than astronomical time. Player x uses SKx to digitally sign messages. For each possible message (binary string) m, x runs algorithm S on inputs m and SKx in order to produce a string, SIGx(m), referred to as x's digital signature of m. Without loss of generality, we assume that m is retrievable from SIGx(m). In fact, if m cannot be retrieved from SIGx(m), we could always redefine the digital signature of party x of a message m to consist of the pair (m, SIGx(m)). Everyone knowing PKx can use it to verify the signatures produced by x. Specifically, on inputs (a) the public key PKx of a player x, (b) a message m, and (c) an alleged digital signature of x for the message m, the verification algorithm V outputs either YES or NO, so as to satisfy the following properties:

i) Legitimate signatures are always verified: If s=SIGx(m) then V(PKx, m, s)=YES; and ii) Digital signatures are very hard to forge: without knowledge of SKx, if x has never signed m, finding a strings such that V(PKx, m, s)=YES requires an astronomical amount of time.

Accordingly, to prevent anyone else from signing messages on his behalf, a player x must keep his signing key SKx secret (hence the term "secret key"), and to enable anyone to verify the messages he does sign, x must make his verification key PKx public (hence the term "public key").

Referring to FIG. 1, an arbiter circuit 100 includes a plurality of multiplexers 102 and a latch 104. Generally, arbiter circuits are mathematically inferrable. The arbiter circuit 100 may be used to provide a PUV. Note that non-inferrability is not a requirement for a PUV, and it is not necessary to keep the delays secret. The circuit 100 creates two different delay paths with the same layout length for each input X, and produces an output Y based on which path is faster. The resolution of the latch 104 is sufficiently fine to ensure that, when given the same input X, the same output Y will be obtained, so long as the environment (e.g., the temperature) does not change significantly. At the same time, due to the microstructure of the circuit and in particular of the wires, the delay varies randomly from chip to chip, and thus a second arbiter circuit with the same layout of a first arbiter circuit will map an input X to an output different than that produced by the first arbiter circuit. In other words, an arbiter circuit carries in itself the means, such as the microstructure of its own wires, to ensure that it is very difficult to produce another arbiter circuit with the same layout that maps an input X to the same output Y produced by the first arbiter circuit on input X. Note that the difficulty of cloning an arbiter circuit depends on the layout being the same. Without this property it would be trivial to manufacture a circuit that on input X produces the same output Y that the circuit 100 produces. That is, having the same layout is a property of arbiter circuits that makes it practically impossible to manufacture a second arbiter circuit with the same input-out behavior of any other arbiter circuit, even on a single input. It is thus important to verify that the property in question, namely having the same layout in the case at hand, is satisfied before considering the input-output behavior.

An arbiter circuit having a pre-specified layout is just an example of a PUV. Any other PUV can be used with the system described herein. In particular, any other integrated circuit that uses its own unique microstructure as means to guarantee that the output it produces in response to a given input is substantially unpredictable, but repeatable. Also, instead of having the same layout, other properties that are satisfied by an arbiter circuit in order to make it hard to clone the arbiter circuit are also possible.

In an embodiment herein, the arbiter circuit 100 produces one bit of output for each challenge C which, in FIG. 1, is shown as having one hundred and twenty eight bits. To ensure a k-bit output for each challenge C, it is possible to augment the arbiter circuit 100 as follows: First, use C as the seed of a predetermined pseudo-random generator, such as a cryptographically secure generator, a linear-feedback shift register, or any other type of pseudo-random generator so as to obtain a sequence of k pseudo-random challenges, $C_1$, $C_2$, ..., $C_k$. Subsequently, the arbiter circuit 100 is challenged in order with each of the pseudo-random challenges. Finally, single-bit outputs resulting from the challenges is concatenated to obtain the desired k-bit response R.

In an embodiment herein, the arbiter circuit 100 is manufactured using a given (mask) layout L, and the microchip is not shielded, so as to make L available to observation. In some embodiments, all arbiter circuits may share the same layout L. Note that the variability in gate delays remains huge even when the layout L remains fixed. A reader is configured to provide an arbiter circuit with the challenge C and to read the corresponding response. In some embodiments, the reader may also store L within.

In operation, the reader verifies whether or not the arbiter circuit 100 simultaneously satisfies the following two properties:

(1) the arbiter circuit 100 has layout L; and (2) the arbiter circuit 100 responds with R to challenge R.

To make this determination the reader performs the following:

1) the reader observes the layout L' of the arbiter circuit 100;

2) the reader compares L' to the stored layout L;

3) the reader challenges the arbiter circuit 100 with C so as to obtain a response R'; and 4) the reader accepts the arbiter circuit 100 if and only if L essentially coincides with L' and R essentially coincides with R'.

In a sense, rather than ascertaining whether a given microchip (of arbitrary and possibly unobservable layout) provides a response (close to) R to the challenge C, the reader applies a challenge to a circuit constituted by a given layout and checks whether a given response is obtained.

In an embodiment herein, the arbiter circuit 100 (or possibly another type of PUV) is embedded into an ordinary banknote to provide a secure banknote 200, possibly along with other customary anti-counterfeit protections. The banknote 200 is displays a value and a unique serial number. The secure banknote may be manufactured as follows:

1) Manufacture the arbiter circuit 100 with layout L.

2) Challenge the arbiter circuit 100 with C so as to obtain and measure a response R.

3) Have the Bank produce a digital signature S of R together with an indication of the value of the secure banknote 200 ($v), and whatever additional information (possibly none), I, is deemed useful. In particular, I may specify date information, an identifier of the secure banknote 200, the layout L of the arbiter circuit 100 (if the layout is not fixed for optimization purposes), and/or the challenge C (if the challenge is not fixed), or, in some instances, possibly no information. For instance, S=SIGBank (R, $100, I).

4) Store S on the secure banknote 200 (e.g., in bar-code format, or in the arbiter circuit 100, if the arbiter circuit 100 is endowed with non-volatile memory).

The secure banknote 200 may be verified as follows:

1) Have the reader ascertain that the arbiter circuit 100 of the secure banknote 200 is open-layout, and that the layout of the secure banknote 200 is sufficiently close to L.
2) If the test in 1) is passed, challenge the arbiter circuit 100 with C to obtain a response R'.
3) Retrieve the alleged signature S and verify that S consists of the digital signature of the bank of a triple (R, $V, I), and that R' is sufficiently close to R.
4) If the test in 3) also passes, output an indication that the secure banknote 200 is valid and that the value is $V.

Figure 2:
FIG. 2 is a diagram illustrating a secure banknote having an arbiter circuit, according to an embodiment of the system described herein.

In FIG. 2, a hexadecimal number 202 underneath the arbiter circuit 100 represents S. The reader is able to take a picture of the arbiter circuit 100, compare the picture with stored L, and challenge the arbiter circuit 100 with C to obtain R' from the arbiter circuit 100. The reader can also read S, verify S and then compare R' against R obtained from S.

An advantage of the system described herein is that secure banknotes and readers need not store any secret information. In addition, although the secure banknotes use digital signatures, a public key infrastructure is not necessary because the system may be implemented with a single public key (e.g., the public used to verify the digital signatures of the bank) which may be publicly known within the system, without being certified by a PKI or other entity. In addition, the digital signature giving value to an unforgeable banknote need not be revoked since a banknote may continue to be valid forever. Of course, the bank has the option of physically destroying a banknote exhibiting wear and tear (or other reasons), and reissuing another banknote for the same value.

It is recommended that the response length be at least 128 bits, to make the probability of collision (i.e., same values from two different PUVs) negligible. The challenge length impacts the reliability of the Arbiter and it may be at least 64 bits. The Arbiter performs relative delay comparisons and therefore may be resistant to aging, voltage and temperature variations. Note that, unlike physically unclonable function applications in conventional integrated circuits, the voltage and temperature variation is significantly less for banknotes. Aging occurs when voltage is applied to the PUV by the reader and this happens very infrequently.

Since the Arbiter is a small circuit, one way to implement a PUV on a banknote is to use printed electronics. In this case, a picture of the PUV can be taken quite easily, and thus it is easy to decide whether a given circuit has a specified layout. Printed electronics technologies use inks and can be directly printed on a banknote (with some preprocessing).

In the system described herein, using a PUV with the same challenge C and the same layout L increases the performance due to efficiency and decrease cost of the reader software. Each secure banknote, however, can have a separate challenge and/or separate layout, which may be stored on the banknotes, together with appropriate digital signature (s). In addition, rather than storing the signature S on a secure banknote, a bank may make S available on the Web, for instance, by publishing S next to a searchable serial number of the banknote, or in response to a query. Note that this is also possible for the signatures of the challenge and/or layout of a banknote, if the challenge and/or layout are different for different banknotes. The reader may retrieve S (and possibly the challenge and/or the layout) by searching the Web for (or making a query about) the serial number of the banknote, and then proceeding as described elsewhere herein. Note that a Web-based alternative generates some "trail", in that a database associating serial numbers to signatures can track reader queries. Thus, in absence of sufficient obfuscating queries, a geo-location of banknotes may be exposed when using the Web to obtain some of the information for the banknotes.

If banknotes are relatively unforgeable, issuing a banknote of very high value (e.g., a $1 M banknote) is a relatively safe option, and enables a compact transfer of an otherwise conspicuous amount of money. If it is desired to make such high-value banknotes traceable, a bank may make signatures of high value banknotes available on the Web or in response to a query.

To increase reliability, it is possible to manufacture secure banknotes using more than one arbiter circuit. For instance, it is possible to use two arbiter circuits, the first circuit answers challenge C1 with a value R1, and the second circuit challenge C2 with value R2. In such a system, the Bank may have a signature S consisting of:

$$S=\text{SIGBank}(R1,R2,\$100,I).$$

The banknote may be considered verified if at least one challenge-response has been properly verified. Thus, if wear and tear disrupts just one of the arbiter circuits, the banknote can still be accepted, and then possibly given to the bank for destruction and reissuance.

The system described herein may be adapted to increase security of a credit card used in a physical application, that is, when the credit card is swiped to obtain payment authorization. In a physical application, of course, fraud may occur if the card is stolen, but it may also occur if the credit card is duplicated. The latter fraud may be prevented by enriching the credit card with an arbiter circuit and a digital signature (of the credit-card company) guaranteeing the response to a chosen challenge, and properly modifying traditional credit-card readers so that the readers can perform the verifications discussed above. Note that the value used for banknotes (e.g., $100) is redundant, and can be omitted.

The system described herein provides ubiquitous verification. The readers may be standardized and manufactured cheaply. Accordingly, secure banknotes may be properly verified whenever the banknotes change hands. For instance, it is possible to routinely have a reader check a banknote before accepting the banknote as payment. Also, with contactless arbiter circuits, cell phones with Near Field Communications (NFC) reader functionality and high resolution cameras, such as most Android smartphones and the recent iPhones, will allow regular users to verify banknotes received by the users.

Ubiquitous banknote verification enables an additional form of security relating to secure transportation of secure money. Although unforgeable, legitimate secure banknotes may still be stolen, and thus the physical transfer of a large quantity of secure banknotes from a bank to, for example, a local branch of the bank or to another bank, would be as insecure as transferring ordinary money. Accordingly, such a transfer would require the use of armored cars, great expense, and danger. To avoid this, it is possible to transport bills of no value or limited value, and then give the bills proper values only when the bills have safely reached an intended destination. For instance, an intended destination may be a local branch of a bank, and the Bank manufactures a bill targeted to become a $100-bill, with an embedded a specific arbiter circuit but not a digital signature. That is, although the bank has already challenged the specific arbiter circuit with C and learned the associated response R, the bank does not print S=SIGBank(R, $100, I) on the banknote, nor does the bank post S on the Web. Thus, prior to S being revealed, the bill is, literally, "just worth the paper it is printed on". The bill may thus be shipped cheaply and without protection to a desired destination. Only after the destination (possibly in a cryptographic secure way) assures receipt of the particular bill (e.g., via its serial number), the bank securely communicates S to the destination, which then prints S on the bill, or stores S in the arbiter circuit, or places S on the Web, or provides S in response to a query, etc. As discussed elsewhere herein, if some form of traceability is desired, as in the case, for example, of a bill that should become a $1 M banknote, then, upon receiving a proper acknowledgement of the bill by the branch, the bank may post S on the web.

Figure 3:
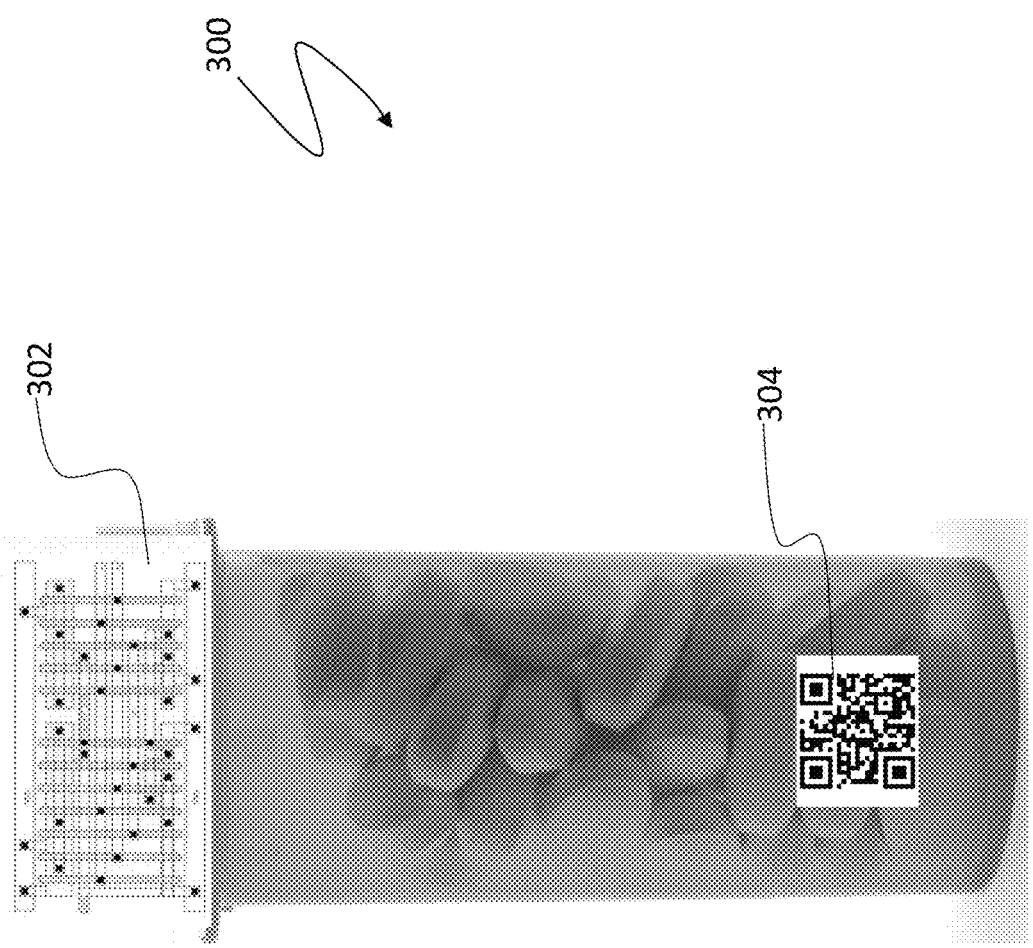
FIG. 3 is a diagram illustrating a set of pills using a PUV and additional information according to an embodiment of the system described herein.

The system described herein may be used to prove authenticity of goods. The system may also be used to prove authenticity of an individual object, or of a set of objects. Referring to FIG. 3, a pharmaceutical firm F may guarantee that a given set G of pills 300 have been manufactured by F and/or that some information I about G holds. For example, F has a public verification key PKF and a corresponding secret signing key SKF. Having manufactured a set G of one or more pills, F wishes to assure possible distributors, vendors, or buyers of the authenticity of the information I that includes an indication of F or information about F (possibly to the level of the specific manufacturing facility) and information about the chemical composition of the pills, the pill production date and/or the pill expiration date, etc. To this end, the set of pills may be put in a proper container and securely sealed in a way that includes an arbiter circuit 302. For instance, a container is sealed (possibly in a way that makes it hard to access the content without breaking the seal and leaving no trace) and the arbiter circuit 302 is securely attached to the seal. That is, the arbiter circuit 302 is attached in a way that makes it impossible (or nearly so) to open the seal without detaching the arbiter circuit 302, where detaching the arbiter circuit 302 causes the arbiter circuit 302 to produce a different value (or different values) than before detachment, or to become unable to produce any value at all. For instance, the container may consist of a sealed piece of aluminum foil with an arbiter circuit properly embedded in the foil. Alternatively, the seal may consist of a plastic bottle and the arbiter circuit 302 may be properly placed between a cap and body of the bottle.

F provides the arbiter circuit 302 with a challenge C and obtains the response R. In particular, the challenge-response may be obtained after the arbiter circuit 302 is properly embedded, if embedding the arbiter circuit 302 may alter a challenge-response behavior of the arbiter circuit 302. F directly or indirectly digitally signs R, and I. (Here and elsewhere in this application, signing something includes the possibility of signing R and I possibly with other data as well—e.g., R and I and C). For instance, S=SIGF(C, R, I) or S=SIGF(R,I) are deemed a direct signature of F of R and I. Those skilled in the art may appreciate that, in this particular example, or anywhere else in herein, S may be an indirect signature. For example, without any restriction intended, to signify its backing of a particular piece of data string D, such as D=(C, R, I), F may generate two data strings D1 and D2 that combined yield D (e.g., interpreting the two data strings as numbers, such that D1+D2=D) and then producing an indirect signature of D, S, consisting of a direct signature of D1, S1, and a direct signature of D2, S2. This way, it is possible to verify that S1 is a direct signature of D1, that S2 is a direct signature of D2, and thus that the signer intended to vouch for D=D1+D2. The signature S and the information I are then written (in suitable form) on the container itself, or in an accompanying document, or posted on the Web, or made available in response to a query or made available in another manner (or in a combination thereof). In an embodiment herein, S and I are provided as a bar code 304 attached to the bottle of pills 300. A buyer or a distributor may verify the container by inspecting integrity of the container and seal, reading the information I, challenging the circuit 302 with C, obtaining a response R', verifying that S is F's digital signature of R and I, and that R and R' are the same or sufficiently close. If all checks are passed, a verifier who trusts F, may also have confidence that the content of the container is as specified in I.

Of course, in this example (and elsewhere herein), some or all steps may be performed by different entities. For example, the pharmaceutical company F may manufacture the pills, but not perform all or part of the other steps. In particular, the pharmaceutical company F could subcontract some or all of the other steps to a separate entity F', and the information I may include an indication of F' and/or S=SIGF'(C, R, I). Also, while using a container may provide some savings, by enabling F to process multiple objects at once, F may prefer to embed an individual arbiter circuit on each individual object. Of course too, information I may be the empty information. For instance, if F produces a digital signature S of just R and someone verifies that S is indeed a digital signature of R, and that R is the circuit response to a standard challenge C, where the circuit securely seals a packet of pills, then, although not having additional information about the pills in the packet, the verifier is guaranteed that the pills are indeed manufactured by F.

The system described herein may be generalized in a number of ways. The arbiter circuit may be understood as any PUV, in particular, one that corresponds to a device D, capable of receiving inputs and generating corresponding outputs, that can consistently produce, on input C, an unpredictable output R. Note that inputs and/or outputs may or may not be in digital form. For instance, inputs may be instructions on how to operate on the device (including shaking the device or applying a given voltage to parts of the device, such as wires) and outputs may consist in the observed reaction of the device to the instructions, and possibly translated into alpha-numeric strings afterwards. Unpredictability refers to the scenario that, without using D itself (e.g., by giving D the input C and then observing the output R that D produces), it is not possible to predict a value R the device D will output on input C. Ideally, R may be perfectly random, that is, if R is a bit string, then each of its bits has a probability one half of being zero and one. But no such perfection is necessary. For instance, if R is a sufficiently long string of (without loss of generality) bits, then for R to be unpredictable, it suffices that each bit of R cannot be guessed correctly with, for example, a probability of greater than 60%. Also, consistency does mean that D must always produce R on input C: for instance, it suffices that D does so most of the times, such as, for example, 80% of the time. Indeed, in such a case, R may be found by giving D input C multiple times and seeing which output is most frequent. Actually, it also suffices that D produces R on input C a non-negligible percentage of the time, for example 5% of the time, and that each value R' is produced by D on input C a significantly less percentage of the time, for example, less than 2%. In fact, by giving C as an input to D multiple times, it is possible to determine the value R that is produced with higher frequency. The indication that that D produces R on input C, includes any of the ways to compute R discussed herein, and appropriate others as well.

The system described herein provides that D can be easily inspected to satisfy a specific property P, and that it is difficult to find another device D', different from D, that satisfies the property P and consistently produces R on input C. Specifically, there is a concrete device A deciding whether a device satisfies property P. For instance, if PUVs consist of arbiter circuits, then P may be the property of having a given layout L, and to enable the verification of the property, it is useful to leave the circuit layout exposed. In particular, it is useful to be able to verify that L has no cuts, and thus that R comes from the circuit rather than a hidden miniaturized circuit. Printable circuits are actually a good choice if it is desirable to rely on a property of having a given layout L. A reader may be loaded with an image or information about the layout L, but in general A can be any device capable of determining whether a PUV satisfies a given property P. Note that the property P and the device A may be chosen by a same entity manufacturing D, or not. For instance, an entity may simply cause (e.g., request) production of a PUV by having P chosen by a different entity, A, by another entity, and D manufactured by yet another entity. In particular, making A includes the possibility that A was already available. Alternatively, device A may have already existed, but is made capable of verifying property P by downloading to A or causing A to download software with which A can verify whether the property P holds.

The system described herein may guarantee that a given copy of a piece of information I is uniquely authentic. A 'copy' of I may mean anything from which I can be correctly retrieved. Any piece of information, including I, may be encoded as a string (e.g., a string of bits or other symbols), and the authenticity of such a string can be guaranteed by means of a digital signature. However, such string can be easily duplicated together with its digital signature, thus making it possible to anyone to generate two identical and authenticated copies of I. A copy of authenticated information I may be 'uniquely authentic' if it is difficult (i.e., impossible, practically impossible, or too expensive) to generate a second authenticated copy of I. A party may generate a uniquely authenticated copy of some information I, by having the party obtain (e.g., manufacture, cause to manufacture, or buy) a PUV D that, on input C produces an output (consistently produces an unpredictable output) R. The party may then digitally sign (or more generally having someone else digitally sign—e.g., on behalf of the party) R and I to produce a signature S. The party may then release or otherwise make available (or having someone else release or otherwise make available) C, R, S, and I.

Note that, taken together, the five quantities D, C, R, S, and I, are an authenticated copy of I, since I is one of the quantities. A verifying party verifies authenticity of such a copy is verified as follows: Let P be the property of the PUV and A be the apparatus for verifying whether a device satisfies property P. Then, to verify the copy, the verifying party verifies that, on input C, D produces the output R; verifies that S is a valid digital signature of R and I of the correct entity (e.g., the party in question or another party acting on behalf of the party in question); and accepts the copy as authentic if both verifications are passed. Note too that D, C, R, S, and I actually constitute a uniquely authenticated copy of I, since it is difficult to find two different PUVs D and D' that produce the same result R on the same input C.

Also note that it is possible to provide a copy of I consisting of just four of the above quantities: e.g., of just D, C, S, and I. It is possible to compute R by just giving C as an input to D. Note that, relative to such four-quantity copies, D, C, S, and I continues to be a uniquely authentic copy of I. If the input C is fixed or publicly known, C too becomes redundant, that is, D, S, and I constitute a three-quantity copy of I that is also uniquely verifiable. Finally, if the signature S of R and I is such that R and I can be computed from S anyway, then D and S alone constitute a two-quantity copy of I that is also uniquely verifiable.

Note that a digital signature of R and I may consist of a digital signature of the pair (R,I), or the string R∥I obtained by concatenating R and I, possibly with some symbol making it clear where R ends and I begins, or of H(R,I), where H is a one-way hash function, or any other way that correctly pins down R and I. Of course digitally signing R and I includes digitally signing R, I, and any other additional information I', for instance I' may include date information or the input C. It is possible to use PUVs to authenticate a good or a set of goods. The good or goods need not be a pill or a medical drug, as described above. In addition, the PUV may be securely attached to the good itself (goods themselves), rather than to a packet including the good(s). As described elsewhere herein, securely attaching a PUV to a good means that removing the PUV causes the PUV not to produce an output in response to an input, or to produce an output that is different than the one the PUV would have produced before being detached. One can then use the PUV to authenticate information about an individual good in the same way one uses the PUV to authenticate information about the content of a packet contain one or more goods (such as a set of pill). Of course, the type of information to be authenticate varies with the application. For instance, a fashion designer may wish to prevent someone to illegitimate reproduce the goods it produces. For instance, Gucci or Vuitton may want the lady bags it produces to be easily distinguished from cheaper counterfeits, RayBan may want to do the same for the glasses it produces, and so forth. Unfortunately, it may not be easy to guarantee to a customer that the good he or she is buying is manufactured by the claimed designer. To do so, the designer may have a PUV D securely attached to G, a good the designer produces, have an input C be given to D so as to produce an output R, digitally sign (or have someone lese digitally sign) R and I (where I may contain an indication of the designer) so as to produce a digital signature S, and have S (possibly together with C and/or R, and or I) made available on the good itself, which includes the PUV D attached to the good. The information I about the good is thus uniquely authenticated. The verification of such information is verified in a way similar to before.

Figure 4:
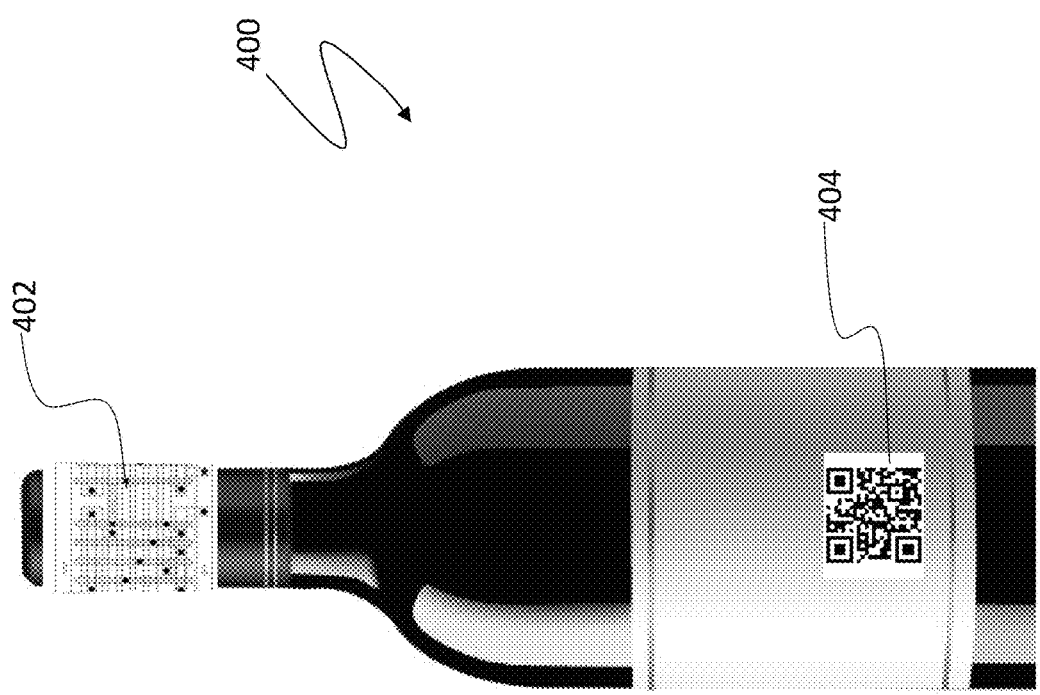
FIG. 4 is a diagram illustrating a bottle of wine using a PUV and additional information according to an embodiment of the system described herein.

A good can also be wine. Referring to FIG. 4, a bottle of wine 400 includes a PUV 402 and a bar code 404 containing digitally signed information. In this case, the information may specify the producer, the year, the time of the harvest of the grape, information about the fermentation process, etc. The good may be another form of liquid, and so on.

Figure 5:
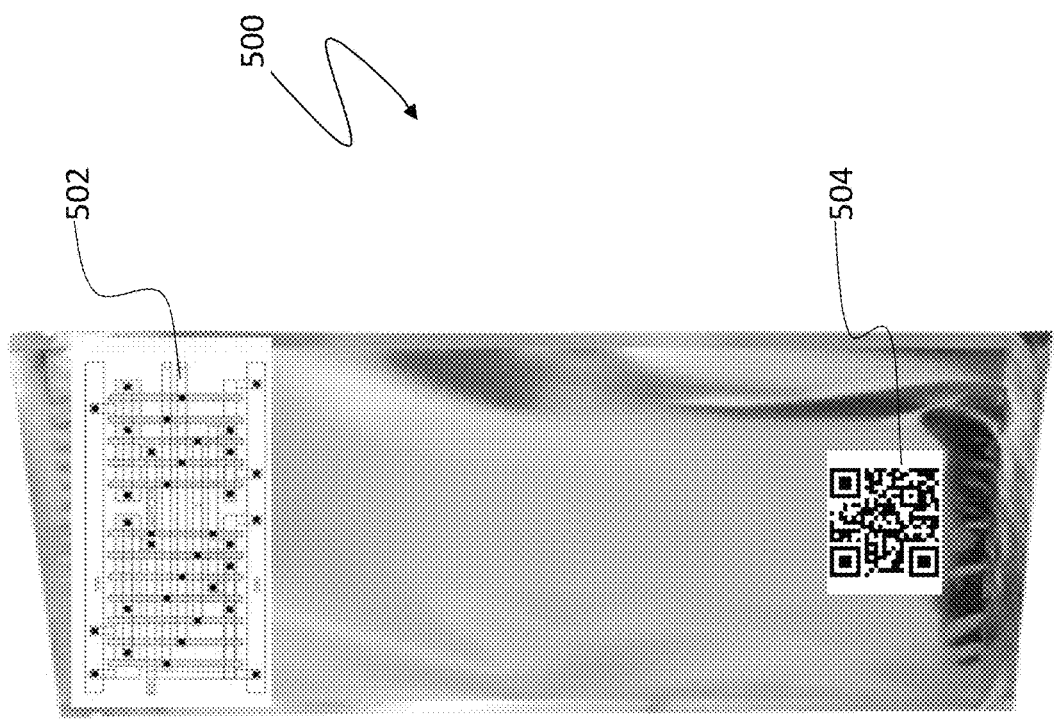
FIG. 5 is a diagram illustrating a packet using a PUV and additional information according to an embodiment of the system described herein.

Referring to FIG. 5, a packet 500, which may be a metallic packet, includes a PUV 502 that may be soldered to the packet 500 or possibly glued. Digitally signed information may be presented as a bar code sticker 504 that is also either soldered or glued to the packet 500. Note that when a PUV D is attached to a good or a packet, the information I may be empty (i.e., the information I may be null). This may be useful in cases where one wishes to authenticate only that the good or the goods into a packet come from a specific manufacturer. For example, if Gucci or Vuitton produces a bag which it wishes to uniquely authenticate, then it may securely attach (or cause to securely attach) a PUD D to the bag, provide an input C to D to produce an output R, and then digitally sign (or have someone sign of its behalf) just R, and make the digital signature available (e.g., by storing it into D itself, on the bag somewhere, on the web or in response to a query.) In this case, it is possible to verify that Gucci (respectively, Vuitton) is the producer of the bag by giving C as an input to D, obtain the response R, and then verifying that the digital signature made available is indeed the digital signature of R of Gucci (respectively, Vuitton).

2. Unique Authentication Using PUFs

It is possible to provide a scheme for an entity E to convey (unique) authenticity of some information I by the following:

Fix and publicize an input C,
Use a PUV D to compute a response R on input C
Compute a digital signature, S, of R and I, and make S available on D itself, or on the good/packet/paper on which D is placed or securely attached If D, with I and S, is sent to a verifier V, then V can check the authenticity (and even the unique authenticity of I) without having to interact with E, or anyone else acting on E's behalf. Thus the above basic scheme is totally non-interactive.

It is possible to have E make C, I or S available on the Web. For instance, D, or the good/packet/paper on which D is placed, may carry a serial number or another form of identifier used by a verifier V to retrieve C, I, or S from the Web. This scheme too may be considered non-interactive, but it may oblige E to manage a possibly large database. For example, E may be a pharmaceutical company that wishes to reassure potential customers of the authenticity of every single pill or bottle of pills that E produces.

It is also possible to have E provide C, I, or S in response to a query, such as a query received via the Internet. This scheme is interactive, because E waits to receive a message or some form of signal from V, to which E responds.

Interactive schemes as the one above may relieve E from running large databases, but may be onerous for E if the queries are numerous and/or frequent. Moreover, a query-answering mechanism could expose E (or whomever acts on E's behalf) to computer viruses and other kinds of cyber-attacks that do not arise in non-interactive schemes since, for non-interactive schemes, E only emanates information to potential verifiers, without having to receive and process any messages from the potential verifiers.

The system described herein provides a non-interactive scheme for unique authentication that relies on a PUF, whether or not implemented via secure hardware.

As described elsewhere herein, PUF is physically unclonable device D implementing an unpredictable function F. D implements F when, on an input x, D outputs $D(x)=F(x)$. F being unpredictable means that, given the value of F at some inputs, it is improbable to predict correctly the value of F at a different input. D being physically unclonable, means that it is substantially difficult to manufacture a different device D' that implements the same function F implemented by D. It is understood that the number of inputs of F is relatively large to make it impractical to go through all of the inputs one by one.

Note that, even though D is a PUF implementing a function F, it is trivial to manufacture a different device D' that implement the same F as a PUF D at just a few inputs, $x_1, \ldots, x_n$. For instance, if one already knows $F(x_1), \ldots, F(x_n)$, or gives $x_1, \ldots, x_n$ as inputs to D so as to obtain $F(x_1), \ldots, F(x_n)$, then it is possible to easily manufacture D' so that, on input one such $x_i$, returns $F(x_i)$. Accordingly, implementing the above basic unique authentication scheme with a PUF instead of a PUV is far from guaranteeing unique authentication.

To guarantee unique authentication via a PUF, it may be necessary to design a very different scheme, which is described below. Without loss of generality, it may be assumed that the information that E wishes to uniquely authenticate is about a set of goods contained in a packet/bottle/container. It should be realized that the same or similar scheme can be used in other applications previously discussed.

Let E be an entity; G be a set of goods; D be a PUF implementing a function F; $d_1, d_2, \ldots, d_k$ be a sequence of dates; and I be some information that E wishes to prove (uniquely) authentic about G at each date in the sequence. For instance, I may consist of the empty information (no information), as in the case in which E may simply wish to authenticate that E is the producer of G or that E approves of G. Also, I may include a digital picture of G or of the goods themselves. To authenticate I at each of the above dates, E acts—or has one or more entity act—as follows:

E chooses a sequence of inputs $C_1, \ldots, C_k$.

E may do so at random or in a sufficiently unpredictable manner. For instance, E generates $C_1, \ldots, C_k$ via some secret value C and a proper algorithm A—such as a collision resistant hash function. For example, $C_i = A(C,i)$.

E may choose C before $d_1$, and may continue to use C for dates after $d_k$.

E provides D with inputs $C_1, \ldots, C\_k$ so as to produce a corresponding sequence of outputs, $R_1, \ldots, R_k$.

For each of such $R_i$, E produces the digital signature $S_i$ of $R_i$ and I.

Possibly E does so that at least $R_i$ is hard to compute from $S_i$.

One way to ensure that a string/message m is hard to compute from a digital signature of the string/message is to digitally sign H(m), where H is a one-way function or a collision resilient hash function. To verify that such a signature S is indeed a digital signature of m one first computes H(m), and then verifies that S is the digital signature of H(m).

E securely seals a packet/bottle/container containing G with D and makes available $S_1, \ldots, S_k$.

For instance, $S_1, \ldots, S_k$ are stored (securely or not) in D, or in a memory device also placed on the container, or simply printed on the container—e.g., in bar-cod format.

$S_1$ and $S_k$ may be stored in order, or in a way that makes it easy to retrieve $S_i$ on input i.

At each date $d_i$, E makes available $C_i$, possibly indicating or with the understanding that input $C_i$ is associated to date $d_i$.

For instance, if dates are days, E publishes an input value every day, for instance, on its website. Then the input that E publishes on day $d_i$ is taken to be $C_i$. E may make $C_i$ available in an authenticated way. For instance, E may digitally sign $C_i$, or $C_i$ and $d_i$, and make such a digital signature available as well.

To check that the information I holds at date di, a verifier V retrieves the associated information Ci. Possibly, V also checks that Ci is indeed authentic, if Ci is available in authenticated form. After that, V provides Ci as an input to D to produce an output Ri. Then, V checks whether a digital signature of E for Ri and I (or a digital signature of a proper entity for Ri and I, if E delegates digitally signing Ri and I to another entity) has been made available on the container. If Ri has been hashed via a collision-resistant hash function H prior to being digitally signed, then V first computes H(Ri), and then looks for a proper digital signature of H(Ri).

If all the above-referenced checks are passed, then V may consider the information I about the goods to be indeed authentic on date di.

Note that this scheme is indeed non-interactive. Indeed, E authenticates I only by emanating information, without answering any query.

To analyze the security of the scheme discussed above, consider (without any restriction intended) the following application. Assume that E is a pharmaceutical company; that the container is a bottle of pills produced by E; that the information I, that entity E wishes to uniquely authenticate about the pills in the bottle, includes an indication about E, the number of pills, the chemical composition of the pills, their side effect, or their expiration date ed, a digitalization of an image of the bottle or of the pills, or both; and that d1, ..., dk consist of consecutive days. For instance, if the pills expire in a year, k may be equal to 365, and d365 may be the expiration date. Then, upon manufacturing the pills and putting them in a bottle, E securely seals the bottle with a PUF D. (e.g., E attaches D between the bottle and its cap so that opening the bottle will cause D to stop working or to implement a totally different and unpredictable function F'.) Then E chooses (e.g., pseudo-randomly based on a secret input C) 365 sufficiently unpredictable numbers C1, ... C365, gives each Ci to D as an input to produce the corresponding output Ri, produces a digital signature Si of Ri and I, and places S1, ..., S365 on the bottle or in D itself. This process can be performed automatically and efficiently before the bottle leaves E's manufacturing facility, at—say—day 0. At each subsequent day d, E publically announces the input Cd. By doing so, E makes it clear that, for any of the bottles of pills (as well each pill, individual good, or set of goods) it produces, if a verifier V wishes to know whether some information I about the bottle or its content is valid at day d, he should use Cd as the input for day d. Specifically, if V wishes to verify whether some information I about a bottle B holds at day d, he should give the PUF D that securely seals B the input Cd, obtain the corresponding output Rd, and check if a valid digital signature of E for Rd and I is made available (e.g., on the bottle or in D). Furthermore V may also want to check some aspects of the digitally signed information are correct. For instance, V may want to check whether the number of pills in the bottle is as digitally signed, whether the bottle of the pills look like the digital image included in the digitally signed information I, etc.

Assume now that the bottle, after production, is shipped to a customer or a pharmacy by mail (or by UPS, Fedex, another special courier, or is provisioned by a company such as Amazon or Alibaba) and that, when the bottle B is still in transit, at—say—day 2, an impostor intercepts B, steals it and wishes to replace it with a fake bottle B'. Then the impostor is going to find it difficult to trick the recipient of B' into believing that B' has been authenticated by E. The customer will receive B' some time later, at—say—day 4. The impostor cannot remove the PUF D from B and place it on B'. Indeed, doing so will cause D to stop working or producing different random inputs, as described elsewhere herein. Accordingly, when the customer receives B' at day 4 and learns (e.g., from the Web) that E's "input for day 4" is C4, and then gives C4 as an input to D, the customer either gets no output or an output R4' which with overwhelming probability has never been digitally signed by E, because the possible outputs of D are very numerous. Accordingly, because no one can forge E's digital signatures, the impostor will not be able to trick the customer. Nor can the impostor open the bottle B and replace the original pills in B with some fake ones, because doing so will again disrupt D. Nor will the imposter be able to successfully trick the customer by making a fake bottle B' and sealing it with a brand new PUF (or other device) D'. Indeed, by acting at day 2 and monitoring the inputs that E makes available (e.g., on the Web) every day up to that point, the impostor may learn C1, E's input for day 1 and also C2, E's input for day 2, but cannot predict what E's input for day 4 will be (nor that for day 3), because the inputs for future days are unpredictable. Accordingly, the impostor can program or manufacture a device D' that given the inputs of previous days produces the same outputs of D, but cannot manufacture D' so that its outputs agree with those of D on future inputs.

Note that in the above application, the dates d1, ..., dk may not correspond to the days up to the expiration dates, but—say—to the number of days sufficient for the bottle to reach the customer: e.g., k=7, if a week is sufficient to transport the bottle to its intended destination. In this case, the signatures S1, ..., S7 may be computed and/or loaded onto the bottle or its PUF prior to shipping rather than manufacturing.

To gain further efficiency, E may use the same Ci to authenticate information about multiple containers at the same date di. Indeed, on the same input Ci, two different PUFs D and D' may produce different outputs, Ri and Ri'. Thus, whether or not the pieces of information I and I' are the same, E's digital signatures for Ri and I will be different from E's digital signature for Ri' and I'.

Notice that digital signatures are very fast to produce, so it is possible to use a much finer granularity than a day. To gain additional efficiency, Merkle-tree signatures can be used. In essence, Merkle-tree signatures enable one to sign arbitrarily many strings with a total computational cost of one hash for each string, plus a single "shared" digital signature.

Finally note that a particular way to manufacture a PUF consists of a secure chip for a circuit C, for a collision-resistant hash function H, intertwined with the circuit D of a PUV (e.g., an arbiter-circuit PUV). For instance, the function F implemented by such a secure chip may be $F(x)=H(x,D(x))$. Note that in this case, the layout of D, whether made public or not, is not exposed, as the layout is protected within the secure chip. Still this chip would be a PUF. Indeed, $F(x)$ is unpredictable even given other input-output pairs. In fact, although $D(x)$ could be inferred from the values of D at inputs different from x, one never sees $D(x)$ in the clear, but only $H(x,D(x))$, that is, D's outputs are masked by the cryptographic function H. Also note that in this application secure hardware is much more secure than usual. When a secure hardware protects a secret key SK stored in long-term memory, one might hope to discover SK after investing a lot of money, because SK is a non-volatile string stored in the secure chip. Of course, this "investment" is justified if the impostor may expect to make a lot more money in return. But the situation is very different here. First, the secure chip described herein does not hide any long-term stored secret key. The function H can be made public, and so can the layout of D. Trying to open the chip in an attempt to expose D and then feed D with various inputs, so as to learn the result and then infer the entire function D(x), is a much harder enterprise. In fact, the function D(x) depends on the microscopic structure of D, and an invasive procedure such as that necessary to successfully open a secure chip would alter D's microscopic structure, thus de facto destroying or fundamentally changing the function D(x) one wished to learn. Furthermore, in the application discussed herein, the output Rd of the PUF, relative to the input Cd of day d, is not per se the "desired authentication", but only a part of it. Indeed, E's digital signature securely binds Rd and the information I about the bottle of pills B. Thus, even if an imposter successfully opens the secure chip D of the PUF that seals B, and learns the function F(x), and manufactures a device D' that implements the same function F as D, the impostor cannot counterfeit anything E produces, but only the bottles of pills that E produces for which the information I remains the same. In fact, even after learning F(x) at great expense, because the impostor is not able to forge E's signatures, the imposter can only hope to "copy" the digital signature that E has previously computed to authenticate some information I. Moreover, if E authenticates I only for—say—the 7 days needed to ship a given bottle B to destination, breaking the PUF securely sealing B at great expense will only enable the impostor to fake the same type of bottle and pills for only a week—perhaps not enough for justifying a sizable investment for breaking the PUF.

3. Constructing PUFs from Weak PUFs.

As discussed elsewhere herein, an arbiter circuit produces one bit of output for each challenge C, but can be augmented so as to produce a k-bit output for each challenge C. In particular, without any limitation intended, the system described herein augments an arbiter circuit as follows:

First, C is used as a seed of a predetermined pseudo-random generator so as to obtain a sequence of k pseudo-random challenges, C1, C2, . . . Ck. For example, if H is a proper hash function, it is possible to define Ci=H(i,C). Then, the arbiter circuit is challenged with each of these pseudo-random challenges in order. Finally, the single-bit outputs are concatenated to obtain the desired k-bit response R.

As also discussed herein, the function F implemented by such an augmented arbiter circuit is random in a very weak sense. For given input C, a corresponding output F(C) is a sufficiently random value, but F is inferable. That is, given F(Ci) for sufficiently many values Ci (possibly each carefully chosen), one can predict F(C) for every future input value C. Of course a truly random function is not inferable.

Thus, an (augmented) arbiter circuit can provide a PUV but not a PUF. However, an (augmented) arbiter circuit provides a weak PUF, WPUF for short. Essentially a WPUF is a physical device D implementing a function F so that, while F might be easily inferable, the following is also true:

(a) For an individual input C, F(C) is sufficiently random, and
(b) Even a slight physical alteration of D results in a conspicuous failure of implementing F. For example, one may get a broken device, or a device implementing a function totally different from F.

Note that it may be much easier to construct WPUFs than PUFs. Indeed, an (augmented) arbiter circuit is itself a WPUF, but not a PUF. Described below is a practical way of constructing PUFs from WPUFs.

Figure 6:
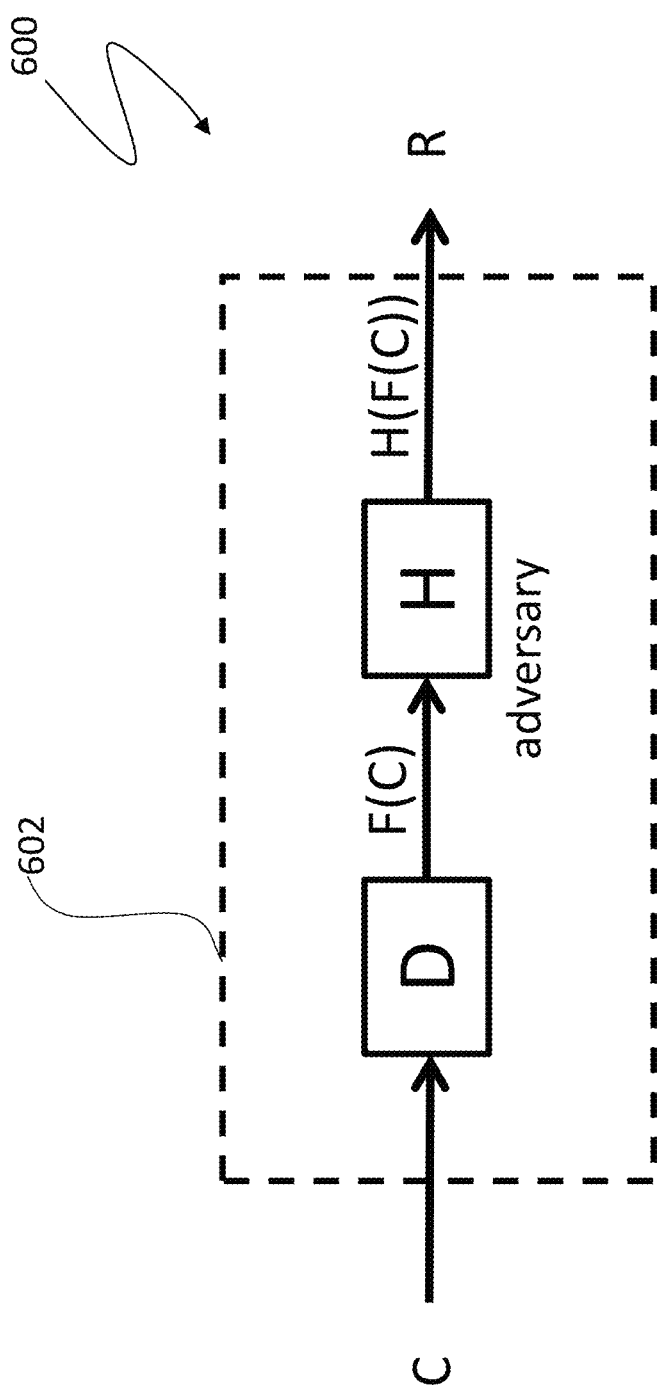
FIG. 6 is a schematic diagram illustrating a limitedly secure way of building a PUF from a Weak PUF according to an embodiment of the system described herein.

As already noted, it may be desirable to prevent the function F, implemented by a WPUF D, from being inferred using a hash function H that masks the outputs of F. A first approach to this strategy may consist of cascading D and H. That is, the output R corresponding to an input C may be obtained by first giving C as an input to D, then having the corresponding output value, F(C), become an input to H, and then having H's corresponding output, H(F(C)), be the final input R. To avoid an adversary inferring the function F by observing input-out values of D, D and H are protected by some form of secure layer (e.g., by making the whole circuitry a piece of secure hardware). The situation is illustrated in FIG. 6, where a diagram 600 shows an input C being mapped to an output R. A dotted box represents a security layer 602 protecting D's output from being readily observed from the outside.

The approach illustrated in FIG. 6, however, may only have a limited value. A secure chip is manufactured so as to make it expensive to tamper with an inside content of the chip without destroying the chip in the process, but it is not necessarily impossible to tamper with a secure chip and obtain information. By investing sufficient financial resources, an adversary may succeed in removing the security layer 602 without altering D. And when the adversary does succeed, then the adversary can, by feeding different inputs to D and observing the corresponding outputs, infer the function F implemented by D. Note that the adversary need not remove the security layer 602 completely. It suffices that the adversary succeeds to insert a "probe" that, without touching/altering D, allows the adversary to see, for sufficiently many inputs C, what are the outputs F(C) produced by D.

Figure 7:
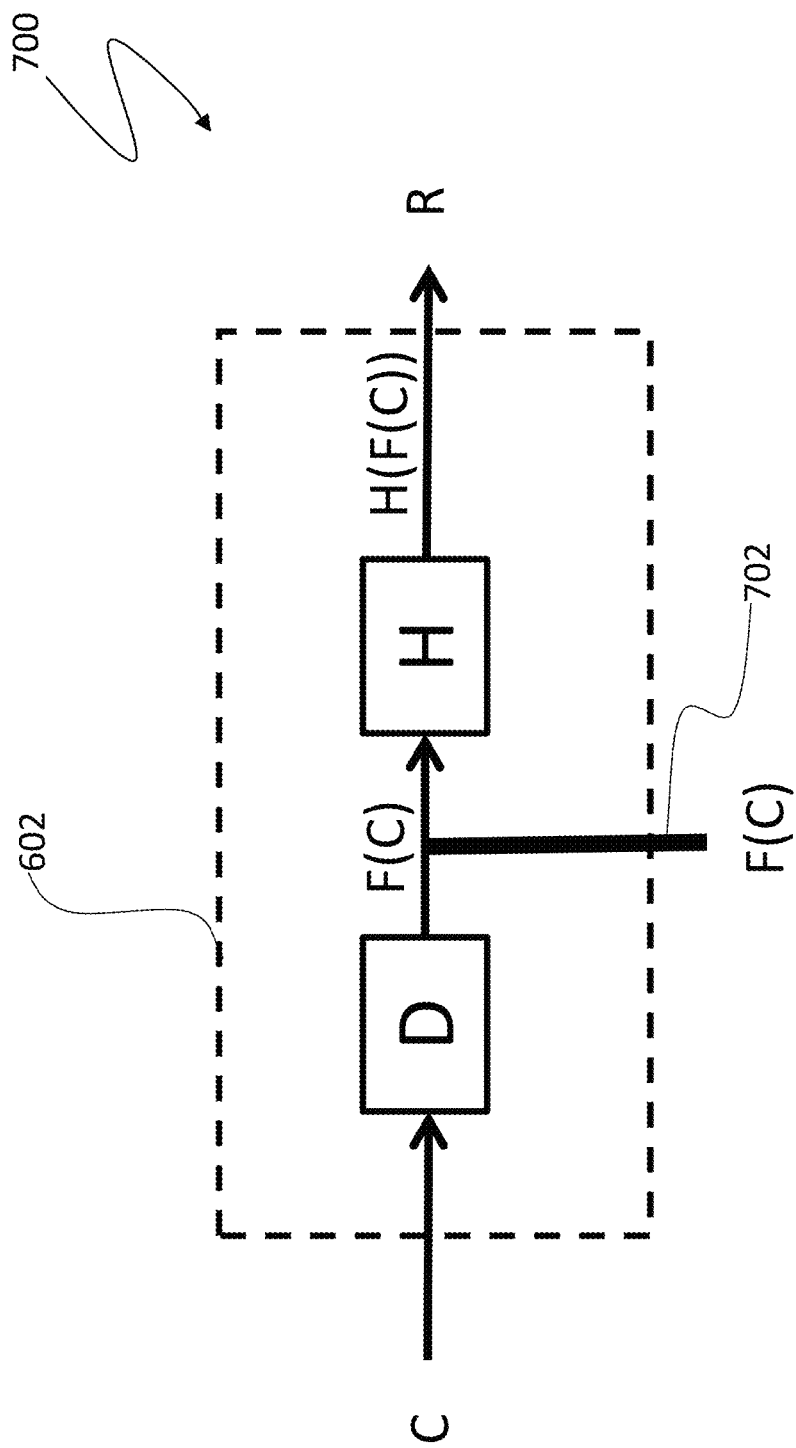
FIG. 7 is a schematic diagram illustrating how to infer an input-output function of a Weak PUF in a limitedly secure PUF illustrated in FIG. 6 via a probe according to an embodiment of the system described herein.

FIG. 7 illustrates a compromised secure chip. A diagram 700 shows a probe 702 that allows the adversary to detect what are the outputs F(C) produced by D.

Figure 8:
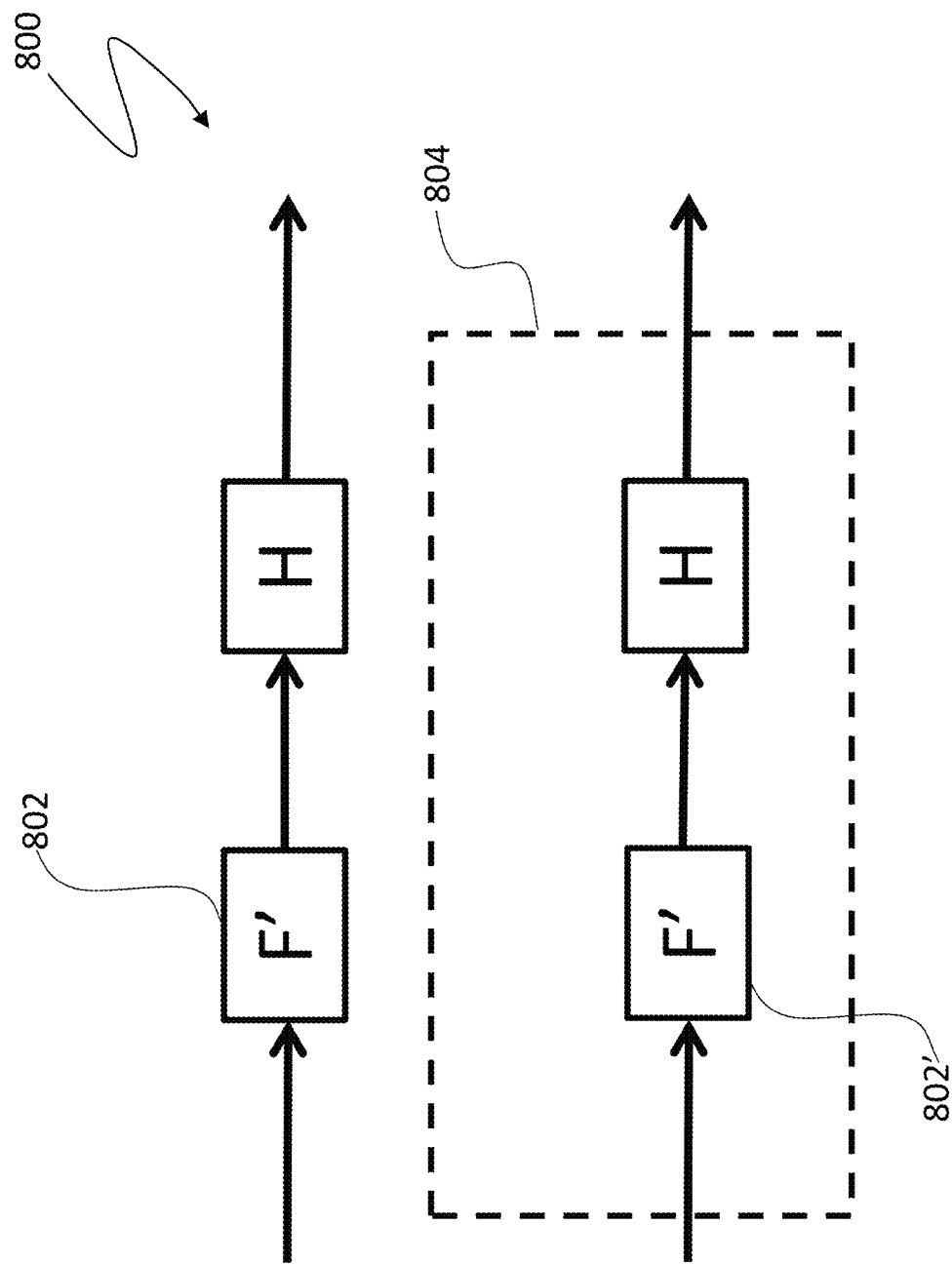
FIG. 8 is a schematic diagram illustrating alternative devices with a same input-output functionality of a limitedly secure PUF of FIG. 6 according to an embodiment of the system described herein.

FIG. 8 includes a diagram 800 showing a different piece of circuitry, F' 802, 802'. After inferring F, the adversary may manufacture F' 802, 802' that that implements F, but in a more standard fashion. By cascading F' 802, 802' and H, then the adversary has de facto cloned the original device, which thus is not quite a PUF. Optionally, to make it harder to realize that the new device is a clone of the original device, the adversary may wrap the new device in a security layer 804. FIG. 8 depicts two equivalent devices, one with the security layer 804 and one without the security layer 804.

To solve the problem illustrated by FIG. 8, it is possible to not use any security layer protecting the cascade of D and H, but, instead, to make D itself the security level. This is a much better alternative to the already suggested method of intertwining D and H. This is explained below.

Figure 9:
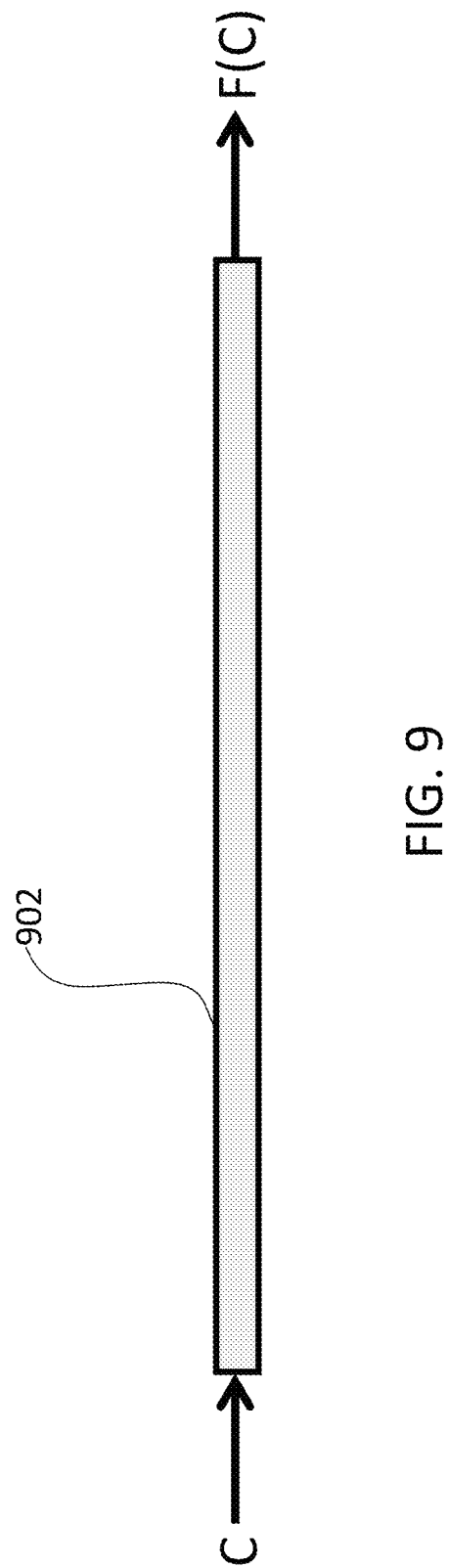
FIG. 9 is a schematic diagram illustrating a Weak PUF, with input-output function F, constructed in linear fashion according to an embodiment of the system described herein.

For concreteness, consider an (augmented) arbiter circuit. Then, as the repetition of a basic module, each module could linearly follow the previous one. A linear design of a WPUF device D 902 implementing a function F is depicted in FIG. 9.

Figure 10:
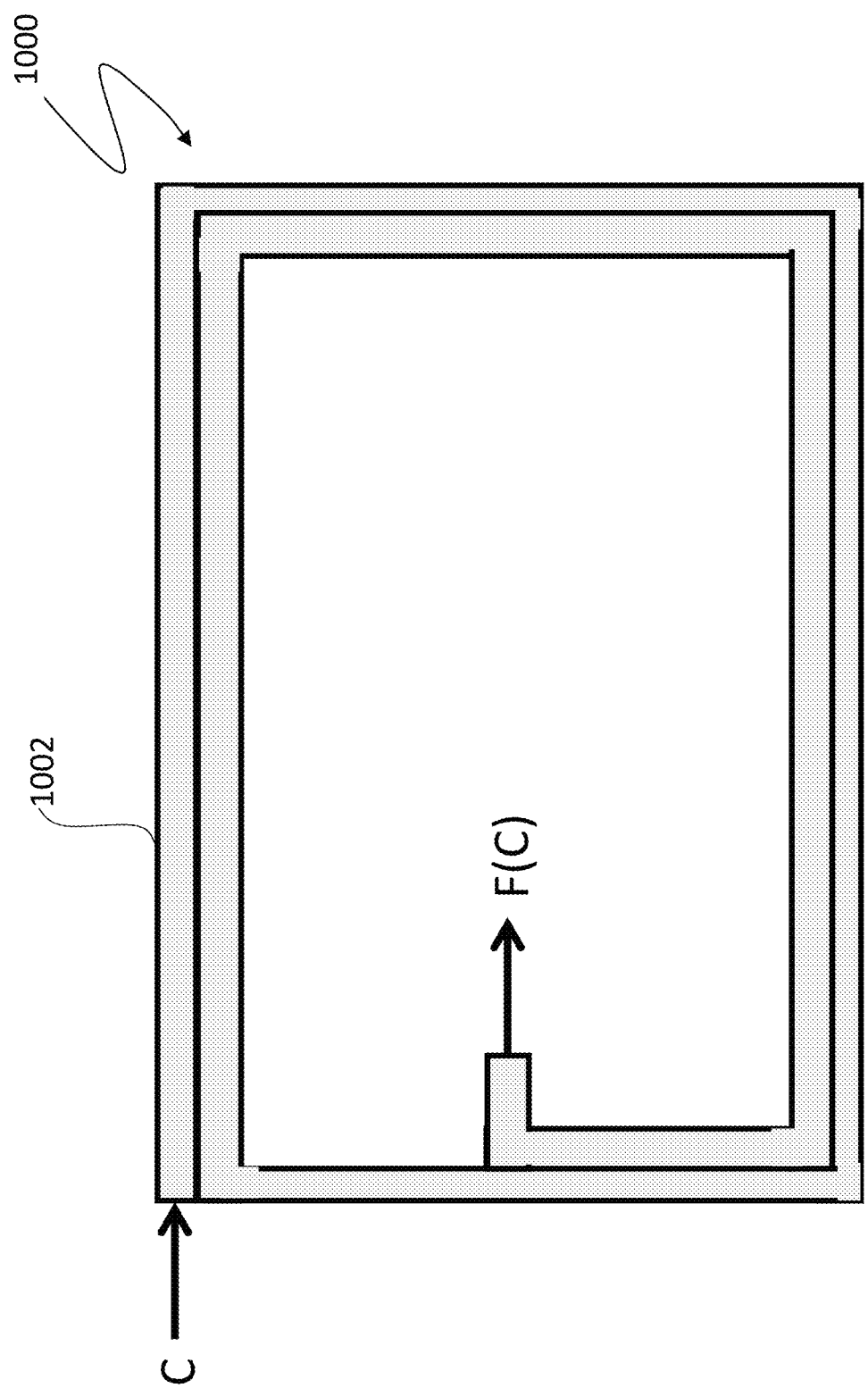
FIG. 10 is a bi-dimensional schematic diagram illustrating a Weak PUF, with an input-output function F, and constructed so as to cover the surface of a given volume, capable of receiving inputs from outside and producing outputs inside a covered volume according to an embodiment of the system described herein.

FIG. 10 shows a WPUF device 1002 that is designed so as to fully cover a tridimensional surface with an inside volume. Generally, a WPUF can be designed to cover the surface of a small cube or parallelepiped. In fact, a WPUF could be wrapped around such a parallelepiped several times, and cover each facet from different directions. In some embodiments, a WPUF could be designed to be practically impossible to reach an inside portion without altering and/or breaking the WPUF circuitry. The WPUF 1002 device in FIG. 10 is drawn as bi-dimensional. Note that the input to the WPUF 1002 can be provided from the outside, but an output from the WPUF 1002 is in the inside.

Figure 11:
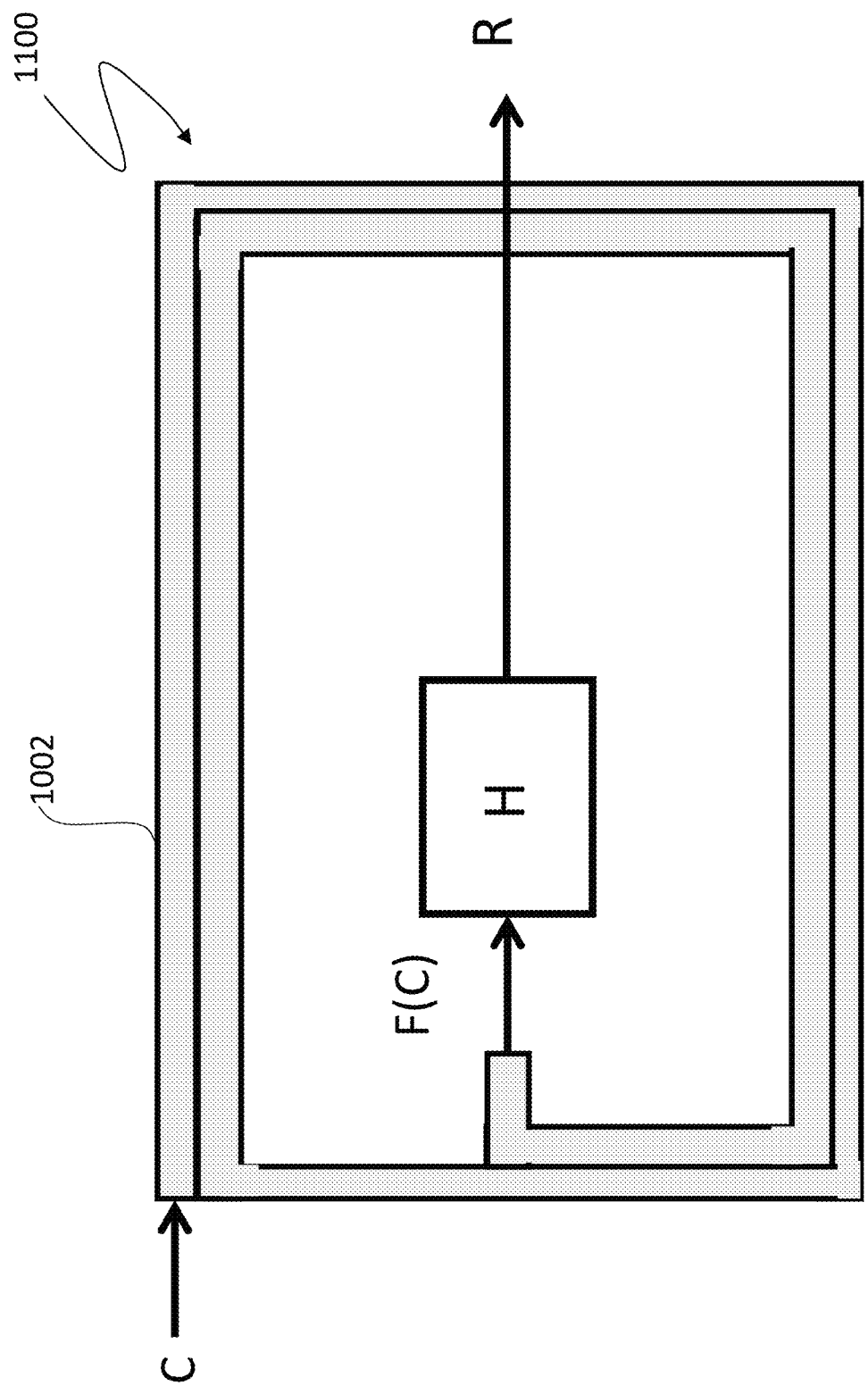
FIG. 11 is a bi-dimensional schematic diagram illustrating a secure way to construct a PUF based on a Weak PUF covering a surface of a given volume and a cryptographic hash function H according to an embodiment of the system described herein.
Figure 14:
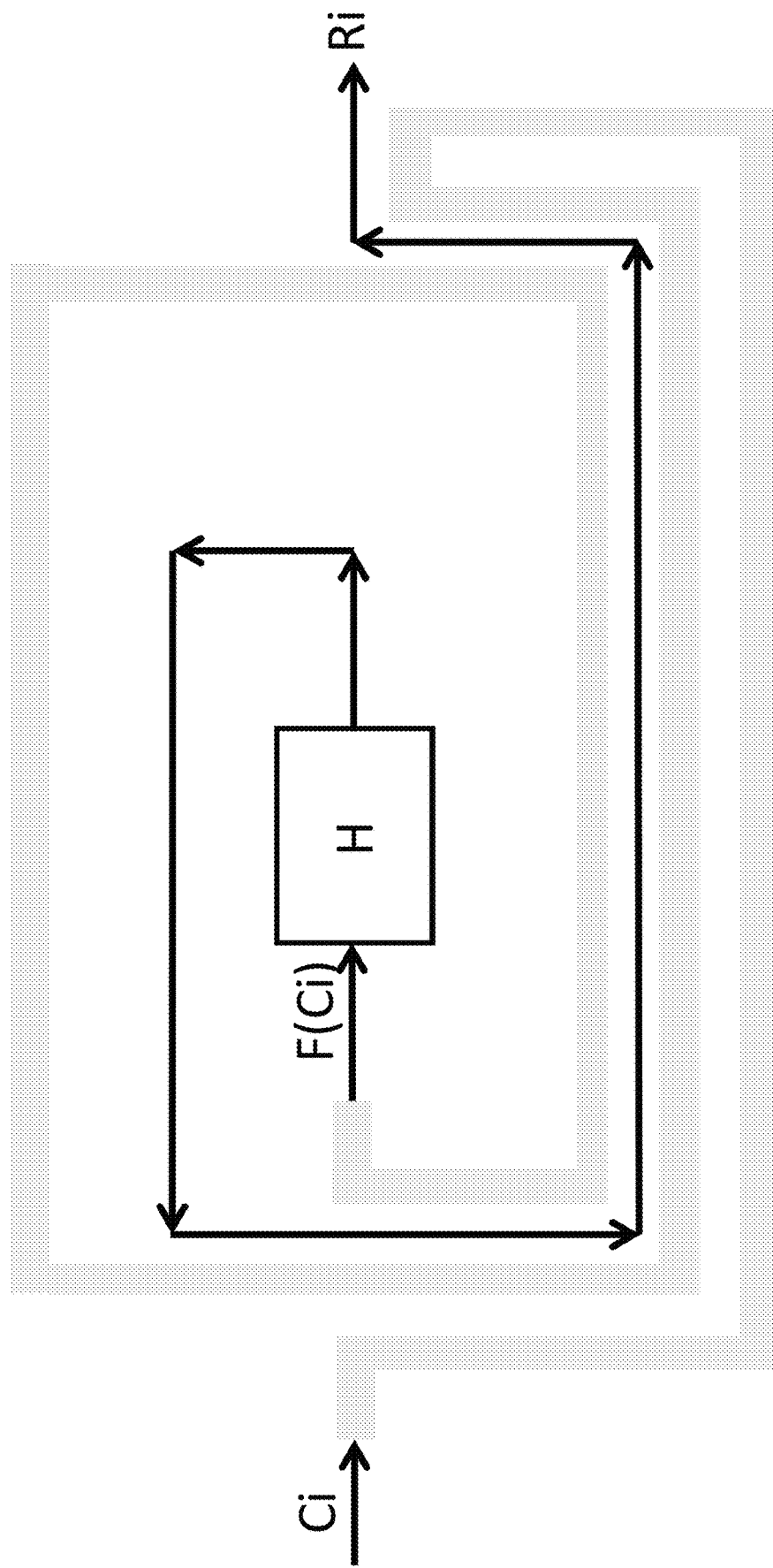
FIG. 14 is a schematic diagram illustrating a PUF of FIG. 11 with an output wire of H that does not intersect a Weak PUF according to an embodiment of the system described herein.

FIG. 11 includes a diagram 1100 that shows the WPUF 1002 cascaded with H. The circuitry of H is placed in the inside of the volume enclosed the WPUF 1002, and an output of H is conveyed to the outside. Therefore, technically speaking, the WPUF 1002 fully covers the outside surface, except where an output wire of H passes. Note that this is a logical depiction. To minimize a volume of the overall device, the inside may be packed much more tightly, but avoiding unwanted "short-circuits". Also, the output wire of H is drawn straight for logical simplicity. However, to avoid that a probe may be inserted along the wire, even assuming that the probe and the wire were the same dimension, the output wire of H may be far from being straight. FIG. 14 depicts an output wire for H that does not intersect D at all.

The reason that the cascading of the WPUF 1002 and hash function H constitutes a PUF P is that one cannot clone the WPUF 1002. Nor can one infer the function $G(C)=H(F(C))$ implemented by the system. Nor can one infer the function F implemented by the WPUF 1002. In fact, although one may provide an input C to the device the WPUF 1002 (and thus to the entire device), one cannot read F(C) on an output of the WPUF 1002, because in order to access an output of the WPUF 1002, even with a probe, one would have to alter ever so slightly (the micro structure of) the WPUF 1002, and any such alteration of a WPUF would cause the WPUF to implement a function totally different from F.

Figure 12:
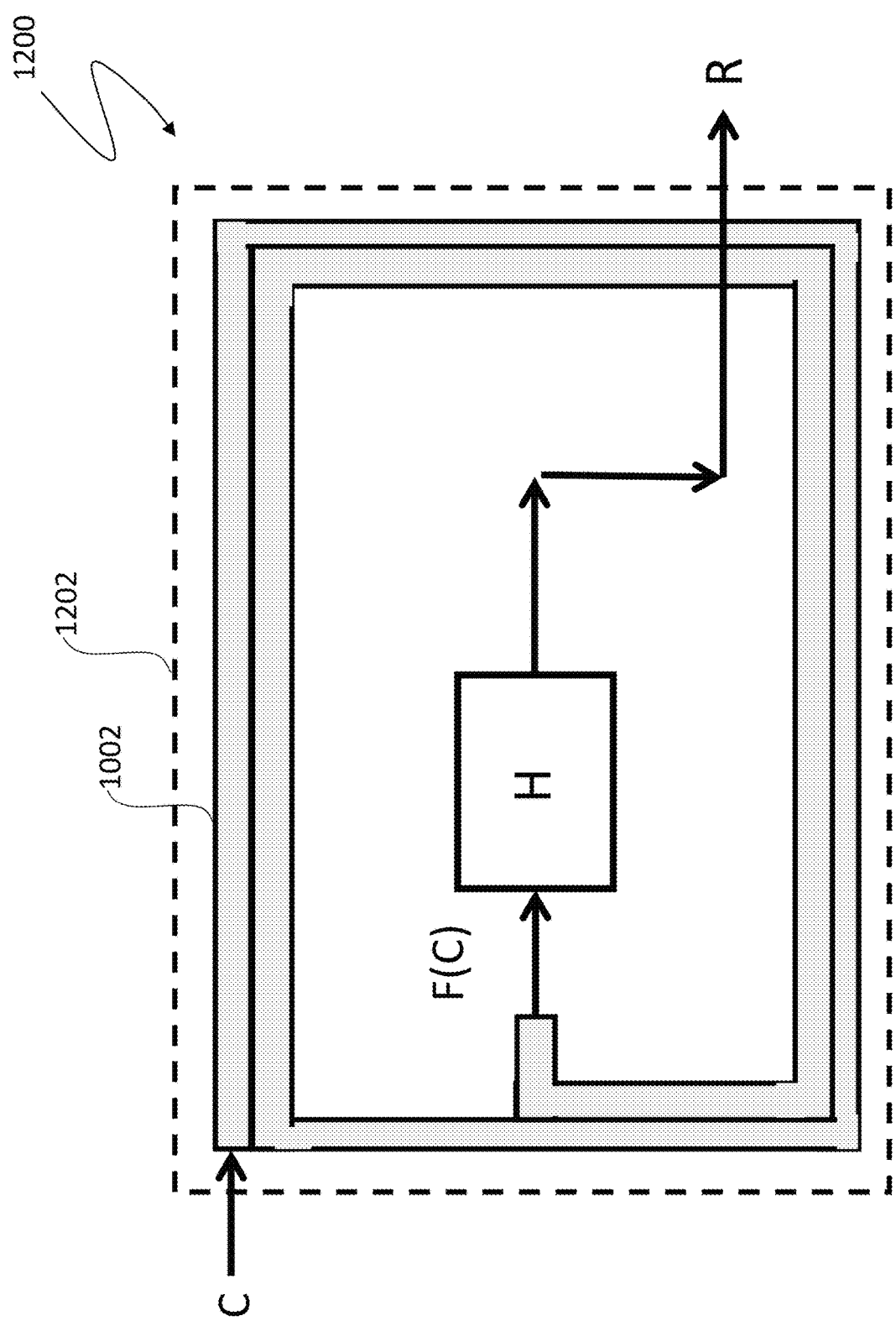
FIG. 12 is a schematic diagram illustrating a PUF as in FIG. 11, with an external protective layer according to an embodiment of the system described herein.

Further, to protect the accidental alteration of the WPUF 1002, it is possible to use an external layer of protection, pictorially indicated in a diagram 1200 of FIG. 12 by a dotted box 1202. The protective layer may be even glued, or attached in a way to the original WPUF. Note that gluing, attaching, securely attaching, or in any way adding the protective layer 1202 may alter the microstructure of the original WPUF, causing it to implement a different function. Any initial alteration does not matter, because the WPUF D that is the first cascaded component of the PUF P is defined to be the final WPUF, and thus, in this case, the WPUF obtained after adding the protective layer 1202.

Figure 13:
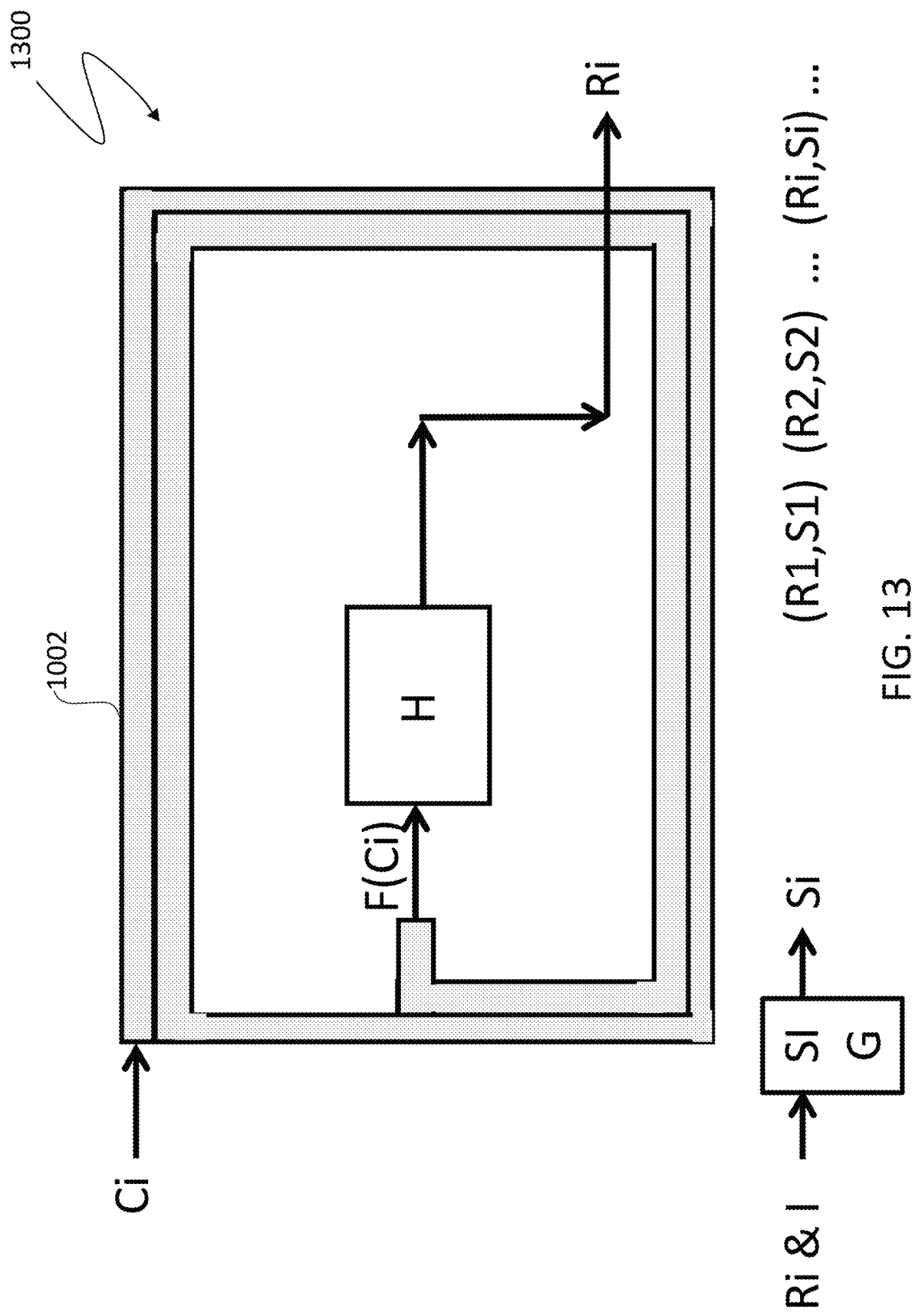
FIG. 13 is a schematic diagram illustrating a system to provide uniquely authentic information I via a PUF, using a PUF of FIG. 11 according to an embodiment of the system described herein.

The PUF constructed according to the description herein may be used, in particular, to implement the authentication scheme, discussed above, that uses a PUF. FIG. 13 includes a diagram 1300 that depicts using the WPUF 1002 of FIG. 11 in order to produce an output Ri corresponding to an input Ci associated to a date di. FIG. 13 also shows an embodiment, discussed elsewhere herein, where a digital signature Si of Ri is produced together with information I requiring unique authentication. FIG. 13 also shows some output-signature pairs that may be stored in or outside the WPUF 1002.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A circuit that provides an output signal corresponding to a physically unclonable function in response to an input signal, comprising:
    a first portion that receives the input signal and provides a random value signal that varies according to the input signal to the circuit; and
    a second portion that hashes a random value corresponding to the random value signal to provide the output signal from the circuit that corresponds to an output value that is a hash of the random value, wherein the first portion covers the second portion to prevent access to the random value signal and wherein a breach of the first portion alters the first portion to change the random value signal that is provided by the first portion.

2. A circuit, according to claim 1, wherein the first portion covers a surface of a cube or parallelepiped.

3. A circuit, according to claim 2, wherein the first portion is wrapped around the parallelepiped a plurality of times to cover each facet thereof from different directions.

4. A circuit, according to claim 1, wherein an output wire that carries the output signal from the second portion does not intersect the first portion.

5. A circuit, according to claim 1, further comprising:
    an external layer disposed on the first portion.

6. A circuit, according to claim 5, wherein the external layer is glued to the first portion.

7. A circuit, according to claim 1, wherein the circuit is affixed to a physical good to prove an authenticity thereof.

8. A circuit, according to claim 1, wherein the circuit is affixed to a physical packet to securely seal the packet.

9. A method according to claim 8, wherein content of the physical packet is at least one of: a medicinal drug, food, or a liquid.

* * * * *